United States Patent
Reith et al.

(10) Patent No.: US 8,447,481 B2
(45) Date of Patent: May 21, 2013

(54) TRANSMISSION

(75) Inventors: Ulrich Reith, Schlier (DE); Mario Steinborn, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 158 days.

(21) Appl. No.: 13/057,534

(22) PCT Filed: Jul. 9, 2009

(86) PCT No.: PCT/EP2009/058714
§ 371 (c)(1),
(2), (4) Date: Feb. 4, 2011

(87) PCT Pub. No.: WO2010/020472
PCT Pub. Date: Feb. 25, 2010

(65) Prior Publication Data
US 2011/0144873 A1   Jun. 16, 2011

(30) Foreign Application Priority Data
Aug. 20, 2008 (DE) .......... 10 2008 041 398

(51) Int. Cl.
*G06F 7/00* (2006.01)
(52) U.S. Cl.
USPC .............................. 701/60; 74/335; 340/456
(58) Field of Classification Search
USPC .............. 701/60, 51, 58; 74/335, 331, 337.5, 74/473; 340/456
See application file for complete search history.

(56) References Cited

U.S. PATENT DOCUMENTS

| | | | | |
|---|---|---|---|---|
| 4,633,730 A * | 1/1987 | Scalisi et al. | ................ | 74/473.24 |
| 5,214,975 A * | 6/1993 | Zalewski | ........................ | 74/411 |
| 6,736,024 B1 * | 5/2004 | Spence et al. | ................. | 74/473.1 |
| 7,506,559 B2 * | 3/2009 | Swanson et al. | ................. | 74/335 |
| 7,530,262 B2 * | 5/2009 | Petzold et al. | ............. | 73/115.03 |
| 7,543,515 B2 * | 6/2009 | Doerr et al. | ................... | 74/337.5 |
| 7,878,084 B2 * | 2/2011 | Petzold et al. | ................... | 74/335 |
| 2004/0112158 A1 * | 6/2004 | Norum et al. | ................... | 74/335 |
| 2007/0034031 A1 * | 2/2007 | Swanson et al. | ................ | 74/335 |
| 2007/0245842 A1 | 10/2007 | Petzold et al. | | |

FOREIGN PATENT DOCUMENTS

| | | |
|---|---|---|
| DE | 197 31 842 A1 | 1/1998 |
| DE | 103 06 641 A1 | 8/2004 |
| DE | 103 36 971 B3 | 10/2004 |
| DE | 10 2005 034 864 A1 | 2/2007 |
| DE | 10 2006 010 616 A1 | 8/2007 |
| DE | 10 2006 018 313 A1 | 10/2007 |
| DE | 10 2006 018 314 A1 | 10/2007 |
| GB | 2 315 526 A | 2/1998 |

* cited by examiner

*Primary Examiner* — Thomas Black
*Assistant Examiner* — Shardul Patel
(74) *Attorney, Agent, or Firm* — Davis & Bujold, PLLC

(57) ABSTRACT

A transmission, such as an automated manual transmission for a motor vehicle, with at least one shift group, such that the shift group or each shift group comprises a shift rail which actuates a shift fork that co-operates with a shift sleeve of the shift group concerned. Associated with the shift rail of the shift group or of each shift group there is a sensor that moves together with the respective shift rail relative to a corresponding measurement receiver such that in the area of at least one shift group, a first relative position between the measurement receiver and the sensor in the actuation direction and a second relative position between the measurement receiver and the sensor perpendicular to the actuation direction of the shift rail concerned can be detected, and from the second relative position, an evaluation device deduces system conditions of the shift group concerned.

11 Claims, 2 Drawing Sheets

TRANSMISSION

This application is a National Stage completion of PCT/EP2009/058714 filed Jul. 9, 2009, which claims priority from German patent application serial no. 10 2008 041 398.4 filed Aug. 20, 2008.

FIELD OF THE INVENTION

The invention concerns a transmission, in particular an automated manual transmission.

BACKGROUND OF THE INVENTION

From DE 10 2006 018 313 A1 a method is known, with which, in a shift group of automated manual transmission, the position of a shift element, namely a shift sleeve, can be determined indirectly without special sensors by determining the deflection of a shift fork that co-operates with a shift rail and the shift sleeve. From DE 10 2006 018 314 A1 a method is known for determining an actuating pressure for an actuating means of the shift rail.

SUMMARY OF THE INVENTION

Starting from there the present invention addresses the problem of providing a new type of transmission. According to the invention, associated with the shift rail of the shift group or of each shift group there is in each case a sensor that can move together with the shift rail concerned relative to a corresponding measurement receiver, such that in the area of at least one shift group, on the one hand a first relative position between the measurement receiver and the sensor in the actuating direction of the shift rail concerned can be detected, and on the other hand a second relative position between the measurement receiver and the sensor perpendicular to the actuation direction of the shift rail concerned, can be detected, and such that an evaluation device derives system conditions of the shift group concerned from the second relative position.

With the transmission according to the invention it is possible, from the second relative position between the measurement receiver and the sensor of a shift group, the second movement being detected perpendicularly to the actuation direction of the shift rail concerned, to derive system conditions of the shift group concerned and hence system conditions of the transmission as a whole.

With the transmission according to the invention not only is the first relative position between the measurement receiver and the sensor of a shift group in the actuation direction detected and evaluated, but also the second relative position perpendicular to the actuation direction, in order to obtain information about the system condition of the transmission. This information can be used to evaluate, adapt, control, regulate shift conditions and/or shift sequences in the shift groups concerned and hence in the transmission. This provides a quite new functionality of a motor vehicle transmission.

BRIEF DESCRIPTION OF THE DRAWINGS

Preferred further developments of the invention emerge from the subordinate claims and from the description given below. Example embodiments of the invention, to which it is not limited, are explained in more detail with reference to the drawings, which show:

DETAILED DESCRIPTION OF THE PREFERRED EMBODIMENTS

Figure 1:
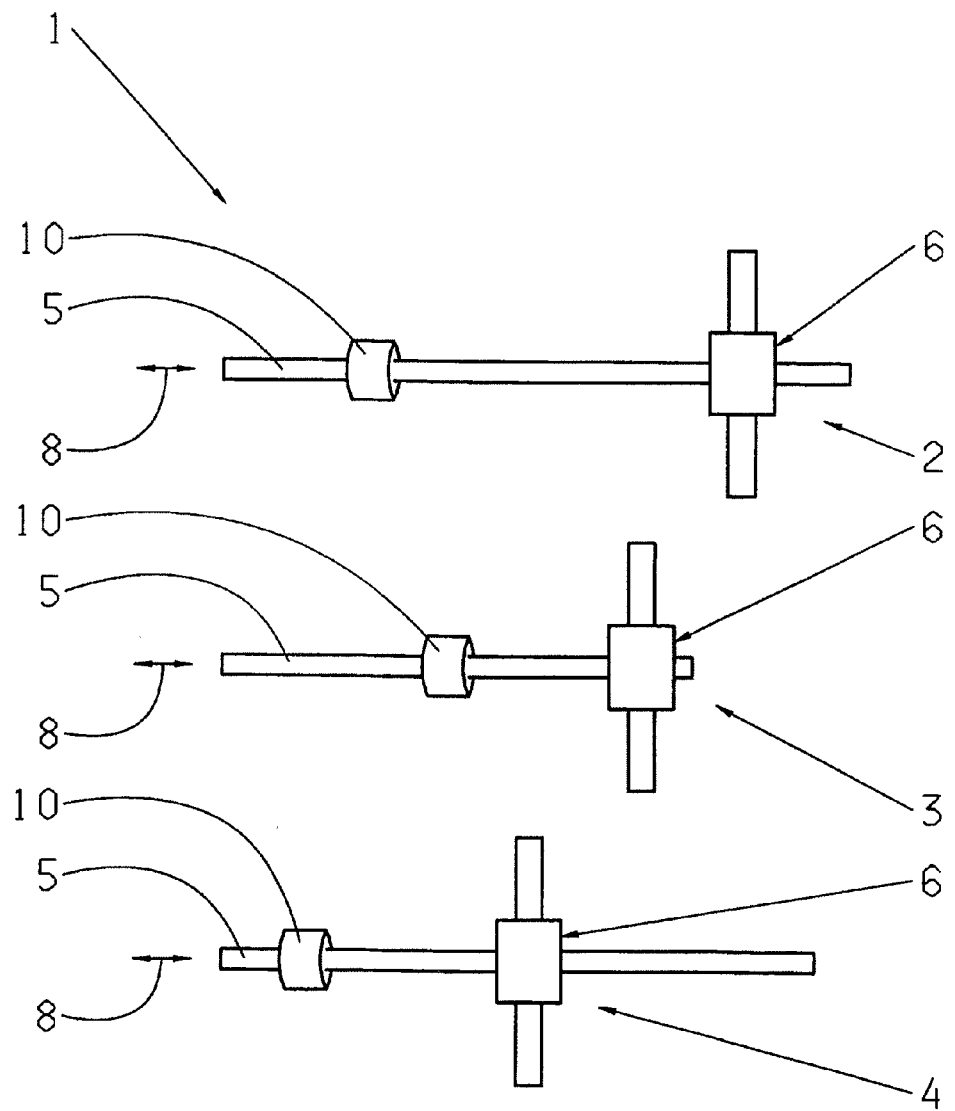
FIG. 1: A very diagrammatic representation of a transmission with three shift groups, viewed from above.
Figure 2:
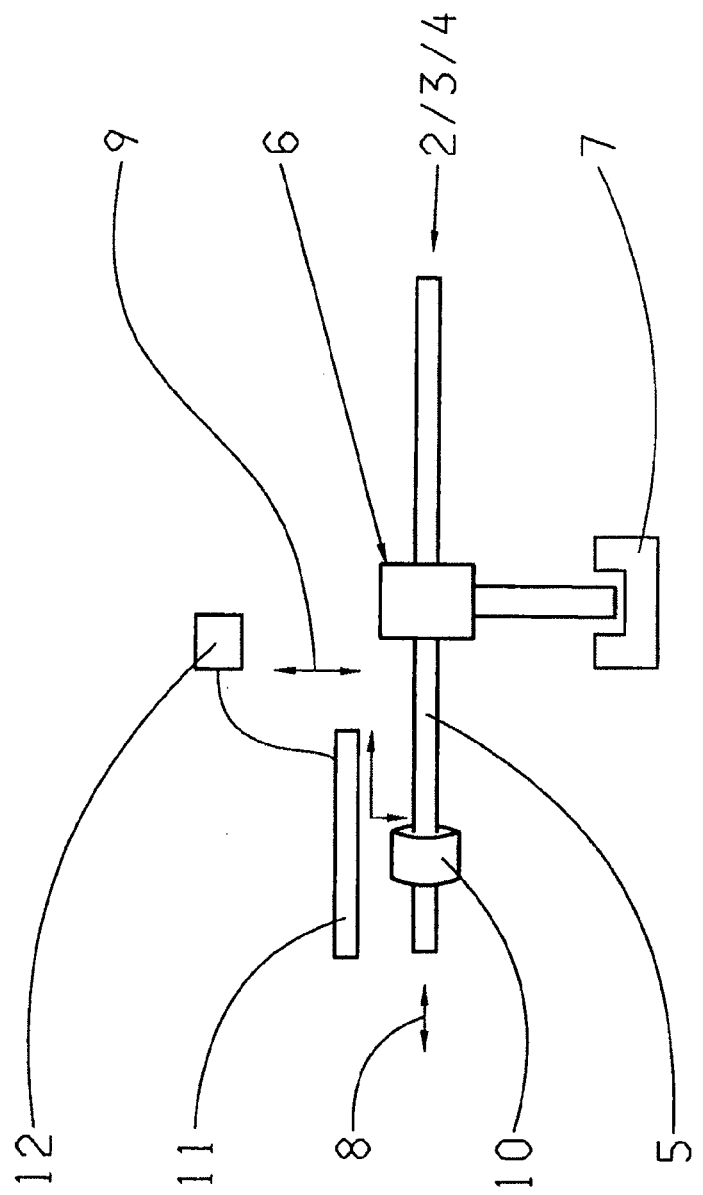
FIG. 2: A side view of a shift group in the transmission shown in FIG. 1

The present invention concerns a transmission of a motor vehicle having at least one shift group. Below, the invention will be described in detail with reference to the example embodiment illustrated in FIGS. 1 and 2, considering the example of a transmission 1 in the form of an automated manual transmission, the transmission 1 of FIG. 1 having a total of three shift groups 2, 3 and 4. FIG. 2 shows one such shift group 2 or 3 or 4, viewed from the side. The shift group 2 can be a main shift group, while shift group 3 can be a splitter group and shift group 4 can be a range group of a so-termed range-change transmission.

Each of the shift groups 2, 3 and 4 comprises a shift rail 5 on which a shift fork 6 engages, the shift fork 6 co-operating with a shift element 7, in particular a shift sleeve. The shift rail 4 of each shift group 2, 3, 4 can be actuated by an actuating element (not shown) and can therefore be moved in translation in an actuation direction 8, this translation movement of the shift rail 5 of each shift group 2, 3, 4 being transmitted by the associated shift fork 6 to the corresponding shift element 7. During this the shift fork 6 of the shift group 2, 3, 4 concerned can undergo a deformation perpendicularly to the actuation direction 8, i.e. along a deformation direction 9 perpendicular to the actuation direction 8.

With the shift rail 5 of each shift group 2, 3 and 4 is associated in each case a sensor 10, the sensor 10 being connected fixed to the shift rail 5 of the shift group 2, 3 and 4 concerned and therefore being able to move together with the shift rail 5 relative to a corresponding measurement receiver 11 of the respective shift group 2, 3, 4 (see FIG. 2).

In the preferred embodiment, in the area of each shift group 2, 3, 4 of the transmission 1, on the one hand a first relative position can be detected between the measurement receiver 11 and the sensor 10 in the actuation direction 8 of the shift rail 5 concerned, and on the other hand a second relative position can be detected between the measurement receiver 11 and the sensor 10 perpendicularly to the actuation direction 8, and therefore in the deformation direction 9 of the respective shift rail 5.

At least from the second relative position of the sensor 10 to the measurement receiver 11 of the shift group 2, 3 or 4 concerned, i.e. at least from the relative position perpendicularly to the actuation direction of the shift rail 5, an evaluation device 12 determines system conditions of the respective shift group 2, 3 or 4 and hence of the transmission 1.

According to an advantageous further development of the invention, from the second relative position between the sensor 10 and the measurement receiver 11 of the shift group 2, 3 or 4 concerned, the evaluation device 12 determines a force acting in the respective shift group 2, 3 or 4 upon the shift rail 5 concerned. In this way, for example, the shifting force that acts upon the shift rail 5 during a gear engagement in the shift group 2, 3 or 4 concerned can be determined. Likewise, the shifting force that acts upon the shift rail 5 during gear disengagement in the shift group 2, 3 or 4 concerned can be determined. Then again, from the second relative position it can sometimes be concluded that no shifting force is acting upon the shift rail 5 of the shift rail concerned, i.e. that the shift group 2, 3 or 4 is free from force.

On the basis of the force acting on the respective shift rail 5 of the shift group 2, 3 or 4 concerned, as determined from the second relative position, the evaluation device 12 can evaluate, adapt, control, and/or regulate shift conditions and/or shift sequences in the shift group 2, 3 or 4 concerned.

Thus for example, it is possible on the basis of the shifting force determined from the second relative position to create a control loop for a so-termed compressed-air hammer effect. For example, if the shifting force determined during gear disengagement is not sufficient for engagement or disengagement of a transmission clutch, then by modulation of the actuating element of the shift rail 5 of the shift group 2, 3 or 4 concerned, the compressed-air hammer effect can be suppressed or controlled.

Furthermore, from the shifting force acting on the respective shift rail 5, determined for a shift group 2, 3 or 4, in combination with the first relative position of the shift rail 5, it can be deduced whether or not a control operation on the shift element 7 has succeeded.

For example, if a crawling disengagement process for a gear is detected in a transmission, such a process also being known as gear-creep, the evaluation device 12 can decide whether the corresponding clutch can be returned to its old position. If the shift rail 5 is deflected in the deformation direction 9 without any measurable position change in the actuation direction 8, i.e. if a change of the second relative position can be detected without any change of the first relative position, then it can be concluded from this that there is no point in further control action on the shift rail 5 under the same boundary conditions. The evaluation device 12 can then decide, for example, to reduce the effective engine torque and hence the stress in the drivetrain in order, thus, to return the corresponding clutch to its old position and thereby to counteract the gear-creep. Likewise, the evaluation device 12 can decide to wait for a load-change in the drivetrain before it again actuates the shift rail 5 of the shift group 2, 3 or 4 concerned.

Moreover, knowing the shifting force that is acting on the shift rail 5 of the shift group 2, 3 or 4 concerned, determined from the second relative position, and knowing also the corresponding first relative position, adaptation parameters can be calculated for shift sequences and their effectiveness can be tested. For example, in order to prevent severe impacts on end-stops of the shift rail 5 of a shift group 2, 3 or 4, a 'cushion' can be formed by controlled filling of the opposite side of a cylinder of an actuating element of the corresponding shift rail 5 in the form of an actuating cylinder.

If the opposite side of the cylinder of the actuating element is filled too much, the shifting time is increased. If the opposite side of the cylinder is not filled sufficiently, the cushion will not be effective.

From the shifting forces determined from the second relative position the effectiveness of the cushion formed on the opposite side of the cylinder of the actuating element can be assessed. Depending on this assessment, a control sequence for the opposite side of the cylinder can then be changed or maintained as it is.

Furthermore, the evaluation device 12 can form a time derivative of the first relative position and/or the second relative position, and assess the shift quality from this. In addition, the evaluation device 12 can form a time derivative of the change with time of the first and/or the second relative position(s), in order to assess the shift quality and if necessary adapt it.

According to a further advantageous development of the invention, from the second relative position of the sensor 10 relative to the measurement receiver 11, the evaluation device 12 determines a torque acting in the shift group 2, 3 or 4 and on the shift rail 5 concerned. As shown in FIG. 1, typically a plurality of shift rails 5 are built into a transmission, and a plurality of sensors 10 are present for determining the position of individual shift rails 5. If no forces are acting upon the shift rails 5 but nevertheless a change of the second relative positions is measureable, it can be concluded from this that torsional deformation of a housing of the transmission subjected to torque loading is taking place. The changes of the second relative positions then provide a measure of the torque acting in the drivetrain.

According to another advantageous further development, from the second relative position the rotational direction of an output shaft of the transmission 1 and/or a travel direction of the motor vehicle can be deduced. Depending on the rotation direction of a transmission output shaft, different forces act on the transmission housing.

Besides the torque, from the second relative position the rotational direction of the transmission output shaft and the travel direction of the motor vehicle can also be deduced. By detecting and evaluating the second relative position between the sensor 10 and the measurement receiver 11 in the shift group 2, 3 or 4 concerned, a number of other system conditions in the transmission 1 can also be concluded.

For example, the wear of an end-stop can be recognized. To determine the position of an end-stop, the corresponding shift element 7 or the shift rail 5 must be brought up against the end-stop with a defined force. By measuring that force reproducible situations can be produced. In addition, the wear of the corresponding end-stop for the shift rail 5 or shift element 7 can be determined.

Furthermore, vibrations in the drivetrain can be recognized. If periodically repeated distance variations of the second relative position are registered when the shift rail 5 is not being actuated, then it can be concluded that vibrations are taking place in the drivetrain. The evaluation device 12 can then initiate countermeasures to reduce the vibrations, for example by modifying the control of a clutch.

Moreover, it is possible for the evaluation device 12 to compute a residual life of components in the transmission 1, for example that of a bearing for the shift rails 5 in the shift groups 2, 3 or 4. Knowledge gained in this manner can then be used, in a new transmission design, to optimize the dimensions of transmission components such as clutches, shift rails, bearings, housings, actuating cylinders', drive engines and the like.

As another system condition the evaluation device 12 can recognize, for example, so-termed transmission rattle. If a transmission rattles during the engagement of a gear, vibrations are transmitted to the corresponding shift rail 5 of the shift group 2, 3 or 4. If the evaluation device 12 registers vibrations in the second relative position, it can conclude that transmission rattle is taking place and initiate countermeasures or generate an error message. From the vibration amplitudes the evaluation device 12 can reach conclusions about the wear condition of any type of shift claws, such as bevel claws, pointed claws, rounded claws and the like.

From the second relative position the evaluation device 12 can also recognize a so-termed tooth-on-tooth position in the transmission 1. For example, if a shift element 7 is not in the area of an end-stop the drivetrain is almost free from torque, and if from the second relative position a shifting force can be deduced which is longer than a specified minimum value, then the existence of a tooth-on-tooth position in an unsynchronized shift element can be concluded. In this situation a tooth-on-tooth position or a synchronization process can also be detected in a synchronized shift element. If a synchronization process has been completed, then in such a case there is always a tooth-on-tooth position.

Moreover, from the second relative position the evaluation device 12 can conclude that jamming of shift elements has occurred. For example, if a shift element 7 or shift rail 5 of a shift group 2, 3 or 4 is in the area of an end-stop, but the drivetrain is not free from torque or there are drivetrain vibrations and no shifting force greater than a specified minimum value can be determined from the second relative position, then jamming of shift elements or a tooth-on-tooth position can be concluded and, if the position determined is outside a typical tooth-on-tooth position range, jamming of the shift element has occurred.

Furthermore, as a system condition of the transmission 1 the evaluation device 12 can assess the connection between the shift rail 5 and shift fork 6 in the shift group 2, 3 or 4 concerned. Namely, if the connection between the shift rail 5 and shift fork 6 is not functioning properly, then when an actuating device associated with the shift rail 5 moves, the shift fork 6 follows this actuation either not at all or only to a limited extent. In that case the shift fork 6 will be supported against slide-blocks only to a limited extent or even not at all, so the shift rail 5 would not be deflected to the extent that it would if the connection between the shift rail 5 and the shift fork 6 were functioning correctly. Consequently, from a second relative position between the sensor 10 and the measurement receiver 11 that is deviant under such conditions it can be concluded that the connection between the shift rail 5 and shift fork 6 is not functional.

Moreover, from the second relative position between the sensor 10 and the measurement receiver 11, the evaluation device 12 can determine an effective value at an engagement point of the shift fork 6 of the shift group 2, 3 or 4 concerned. From a shifting force determined from the second relative value, together with shift rail 5 and/or shift fork 6 movement path information in the shift group 2, 3 or 4 concerned determined from the first relative position, the effective path of the engagement point of the shift fork 6 can be calculated. Knowledge of this effective path makes it possible to operate with smaller or thinner shift elements than has until now been usual in transmissions. In addition there is no further need for excess movement margins and overlaps, of the type made necessary for safety reasons in transmissions known from the prior art due to ignorance of the effective path. Besides, on the basis of the effective path so determined, wear of the shift element can be recognized.

When transmission functions such as actual gear recognition are based on the effective path, the tolerances and hysteresis required until now can be avoided.

From the effective path determined from the second relative position in the shift group 2, 3 or 4 concerned, or from the correspondingly determined shift forces, transmission geometries can be learned and adopted.

Furthermore, using the respective second relative position in the shift group 2, 3 or 4 concerned, the evaluation device 12 can assign parameters to transmission models. Thus for example, the behavior of shift elements in the transmission can be simulated using mathematical models. In this it is assumed that all the components involved always behave in the same way and according to specification. As explained above, by virtue of the invention many system conditions of the transmission 1 can be determined or derived, on the basis of which parameters can be assigned for use in mathematical models of the transmission in order to enable more accurate simulation of the transmission components.

In addition, from the shifting forces determined during gear engagements and disengagements it is possible to diagnose engine suspension points and transmission suspension points of the motor vehicle. For example, if no shifting forces are acting on the shift rails 5 but nevertheless a change of the second relative position is measureable, then this indicates torsional deformation of a transmission housing subjected to torque loading. Thus, as already explained earlier, the change of the second relative position gives a measure for the torque acting in the drivetrain. However, this transmission housing distortion depends on the transmission suspension. If the distortion behavior of the transmission housing changes, then a change of the transmission suspension can be deduced.

Accordingly, from a knowledge of the second relative position between the sensor 10 and the measurement receiver 11 in each of the shift groups 2, 3 or 4 concerned, the evaluation device 12 can draw conclusions about a number of different system conditions of the respective shift groups and thus about the transmission 1 as a whole.

INDEXES

1 Transmission
2 Shift group
3 Shift group
4 Shift group
5 Shift rail
6 Shift fork
7 Shift element
8 Actuation direction
9 Deformation direction
10 Sensor
11 Measurement receiver
12 Evaluation device

The invention claimed is:

1. An automated manual transmission, for a motor vehicle, comprising:
   at least one respective shift group, the at least one shift group comprising a respective shift rail which actuates a shift fork that co-operates with a shift sleeve of the respective shift group,
   a respective sensor (10) being associated with the respective shift rail (5) of the at least one respective shift group (2, 3, 4), the respective sensor (10) moving together with the respective shift rail (5) relative to a single respective measurement receiver (11) such that, in an area of the at least one respective shift group (2, 3, 4), both a first relative position between the respective measurement receiver (11) and the respective sensor (10) in the actuation direction (8) of the respective shift rail (5) and a second relative position between the respective measurement receiver (11) and the respective sensor (10), perpendicular to the actuation direction of the respective shift rail (5), are detectable, and
   an evaluation device (12) being coupled to each respective sensor (10) for deducing, from the second relative position, at least one system condition of the at least one respective shift group (2, 3, 4).

2. The transmission according to claim 1, wherein in an area of each of a plurality of respective shift groups (2, 3, 4), for each of the plurality of shift groups (2, 3, 4), a first relative position between the respective measurement receiver (11) and the respective sensor (10) in the actuation direction (8) of the respective shift rail (5) and a second relative position between the respective measurement receiver (11) and the sensor (10) perpendicular to the actuation direction of the respective shift rail (5) are respectively detectable.

3. The transmission according to claim 1, wherein the evaluation device (12) determines, from the second relative position, a force that is acting on the respective shift rail of the respective one of the plurality of shift groups (2, 3, 4).

4. The transmission according to claim 2, wherein the evaluation device (12) determines, from the second relative position, a shifting force that acts on the respective one of the plurality of respective shift groups (2, 3, 4) during gear engagement.

5. The transmission according to claim 2, wherein the evaluation device (12) determines, from the second relative position, a shifting force that acts on the respective one of the plurality of respective shift groups (2, 3, 4) during gear disengagement.

6. The transmission according to claim 2, wherein on a basis of the force acting on the respective one of the plurality of shift groups (2, 3, 4), the evaluation device (12) at least one of evaluates shift conditions, and shift sequences of the respective one of the plurality of respective shift groups (2, 3, 4), controls, regulates and adapts the shift conditions, and the shift sequences of the respective one of the plurality of respective shift groups (2, 3, 4).

7. The transmission according to claim 2, wherein the evaluation device (12) determines, from the second relative position of the respective one of the plurality of respective shift groups (2, 3, 4), a torque acting in the drivetrain.

8. The transmission according to claim 7, wherein on the basis of the torque, the evaluation device (12) at least one of evaluates, controls, regulates and adapts the shift conditions and the shift sequences in the respective one of the plurality of respective shift groups (2, 3, 4).

9. The transmission according to claim 1, wherein the evaluation device (12) determines, from the second relative position of the respective one of the plurality of respective shift groups (2, 3, 4), at least one of a rotational direction of an output shaft of the transmission and a travel direction of the motor vehicle.

10. An automated manual transmission for a motor vehicle, the transmission comprising:

first, second and third shift groups (2, 3, 4), each of the first, the second and the third shift groups (2, 3, 4) comprising a respective shift rail (5) which actuates a respective shift fork (6) that communicates with a shift sleeve (6), a single respective sensor (10) being fixed to each of the respective shift rails (5) of the first, the second and the third shift groups (2, 3, 4), a single respective measurement receiver (11) being supported adjacent to each of the single respective sensors (10) of the respective shift rails (5) such that movement of the respective shift rail (5) biases the respective shift fork (6) and the respective sensor (10) in relation to the respective measurement receiver (11), and the respective measurement receiver (11) detecting movement of the respective shift rail (5), via the respective sensor (10), in both an actuation direction (8) and a deformation direction (9) which is perpendicular to the actuation direction (8), and an evaluation device (12) communicating with the respective measurement receiver (11) for transmitting signals, relating to the movement of the respective shift rail (5) in the actuation direction (8) and the deformation direction (9), to the evaluation device (12) which evaluates the signals to determine a function of the first, the second and the third shift groups (2, 3, 4).

11. An automatic shift transmission for a motor vehicle, the automatic shift transmission comprising:

at least one respective shift group, wherein each respective shift group comprises a respective shift rail which actuates a respective shift fork of the respective shift group;

a respective shift sleeve shift element which interacts with the respective shift fork;

a single respective sensor (10) being assigned to each respective shift rail (5) of each respective shift group (2, 3, 4), the respective sensor (10) and the respective shift rail (5) are displacable together relative to a single respective sensing element (11);

in the region of the at least one respective shift group (2, 3, 4), a first relative position between the single respective sensing element (11) and single respective sensor (10), in the actuating direction (8) of the respective shift rail (5), is first detectable, and a second relative position, between the single respective sensing element (11) and single respective sensor (10), perpendicular to the actuating direction of the respective shift rail (5), is also detectable; and an evaluation device (12) derives, from the second relative position, a system state of the respective shift group (2, 3, 4).

* * * * *